United States Patent [19]
Fisher

[11] 3,986,238
[45] Oct. 19, 1976

[54] METHOD OF MAKING A HOOKS JOINT

[75] Inventor: Leslie George Fisher, Birmingham, England

[73] Assignee: GKN Transmissions Limited, Birmingham, England

[22] Filed: Feb. 4, 1975

[21] Appl. No.: 547,064

[52] U.S. Cl. ............................ 29/148.4 A; 29/432; 29/434; 29/451; 29/446; 64/17 A
[51] Int. Cl.² ................... B21D 53/12; B21H 1/12; B21H 1/14; B21K 1/02
[58] Field of Search ............. 29/148.4 A, 432, 434, 29/450, 446, 451; 64/17 A, 17 R

[56] References Cited
UNITED STATES PATENTS

| | | | |
|---|---|---|---|
| 1,008,029 | 11/1911 | Gorman | 29/432 UX |
| 1,843,764 | 2/1932 | Galloway et al. | 64/17 R |
| 1,987,415 | 1/1935 | Padgett | 29/432 X |
| 2,259,186 | 10/1941 | Swedman | 29/432 UX |
| 3,062,026 | 11/1962 | Pitner | 29/148.4 A X |
| 3,112,563 | 12/1963 | Kamborian et al. | 29/432 |
| 3,492,710 | 2/1970 | Pitner | 29/148.4 A |

FOREIGN PATENTS OR APPLICATIONS

| | | | |
|---|---|---|---|
| 874,561 | 4/1953 | Germany | 64/17 R |
| 999,569 | 7/1965 | United Kingdom | 64/17 A |
| 901,854 | 7/1962 | United Kingdom | 64/17 A |

Primary Examiner—Charlie T. Moon
Attorney, Agent, or Firm—Neil F. Markva

[57] ABSTRACT

A Hooke's joint comprises four bearing cups received in openings in respective yoke arms and retained therein by respective retaining elements. At least one retaining element associated with each yoke has radially-projecting fingers which terminate in cutting edges and which are seated in a groove cut in the wall of the corresponding opening by rotation of the retaining element. There is also described a tool for contracting the retaining element to enable it to be inserted into the opening and for rotating the retaining element.

4 Claims, 5 Drawing Figures

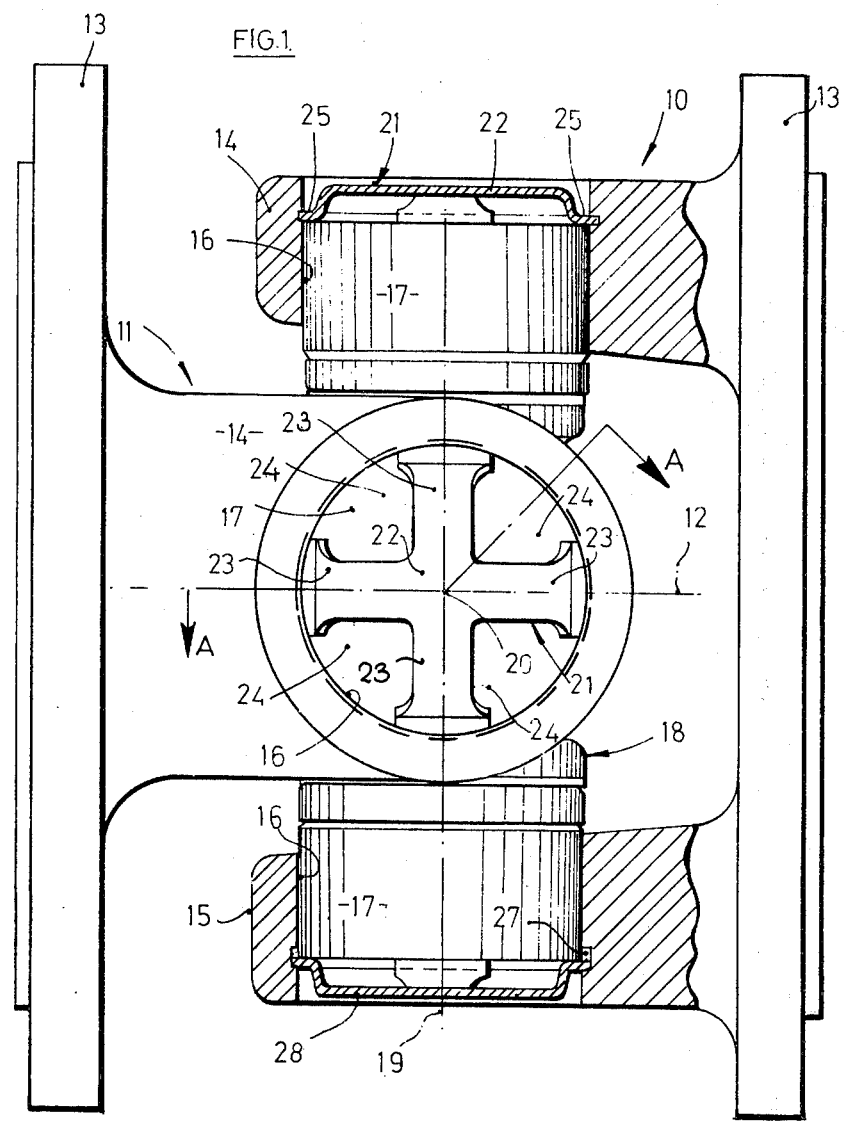
FIG.1.
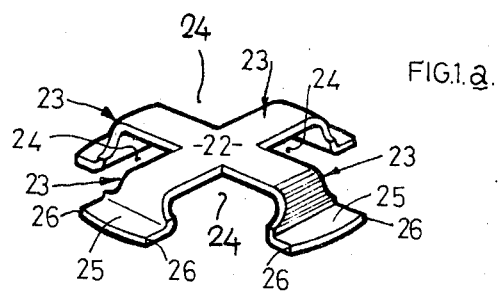
FIG.1.a.

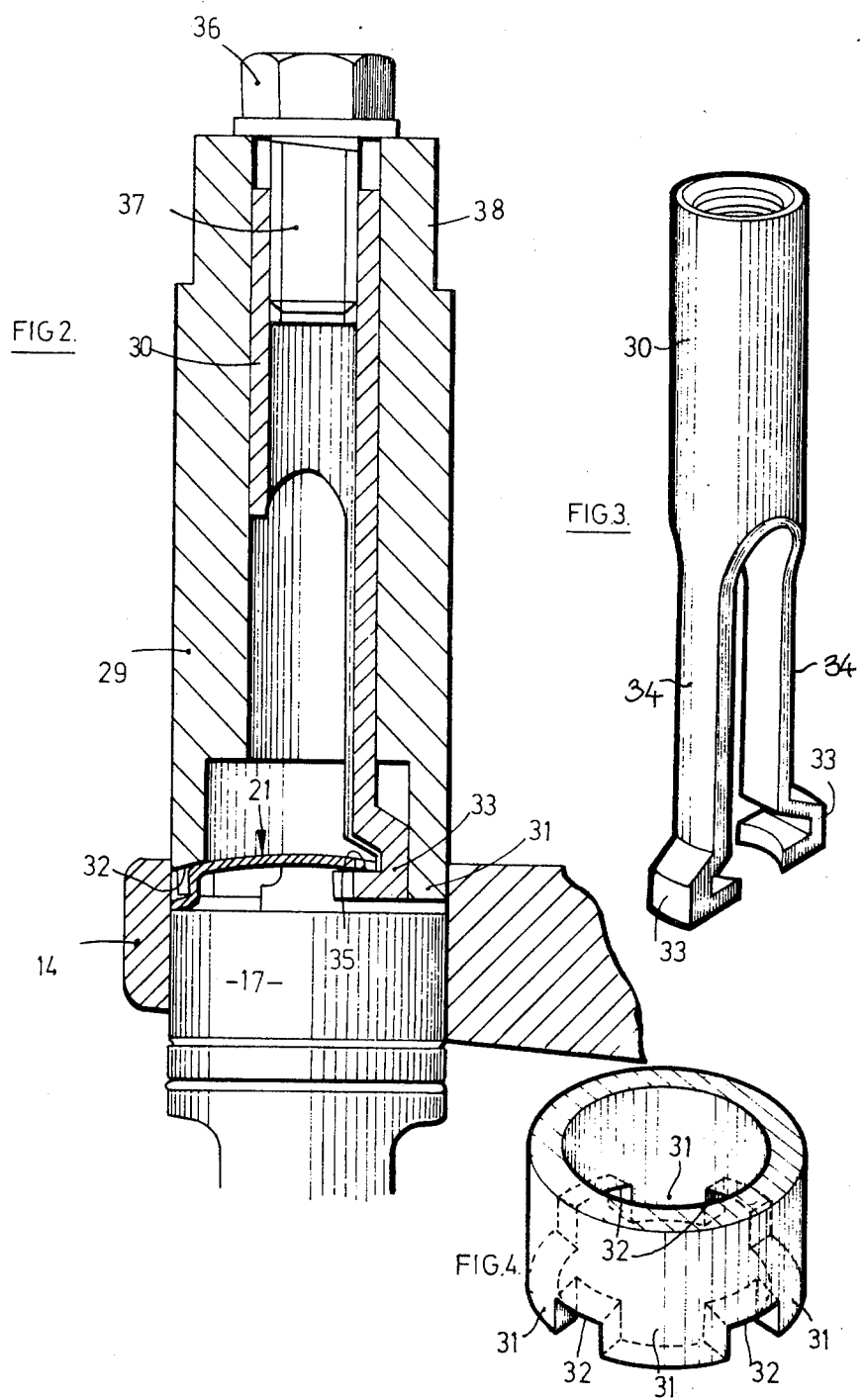

METHOD OF MAKING A HOOKS JOINT

BACKGROUND OF THE INVENTION

FIELD OF THE INVENTION

From one aspect, the present invention relates to a universal joint of the kind, hereinafter called the kind specified, normally referred to as a Hooke's joint and comprising two yoke elements which in use rotate about respective axes (hereinafter called the rotary axes) and a connecting member connected to each of the yoke elements for pivotal movement about respective axes (hereinafter called the pivot axes) which are mutually perpendicular, the pivot axis of each yoke element also being perpendicular to the rotary axis of that yoke element, each yoke element comprising a base portion and a pair of arms projecting from the base portion in a direction longitudinally of the rotary axis, each yoke arm being formed with an opening in which a respective trunnion of the connecting member is received and the joint further including retaining elements associated with respective yoke arms for controlling movement of the associated trunnion relative to the arm in a direction away from the rotary axis.

Joints of the kind specified generally also include bearing cups situated one within the opening of each yoke arm to receive the associated trunnion of the connecting member, each bearing cup containing a plurality of needle bearings interposed between the trunnion and the peripheral wall of the cup. A form of retaining element which has commonly been used is a circlip. When such a retaining element is used, an annular groove to receive the circlip must be machined in the yoke arm adjacent to the outer end of the opening therein. Such groove can be formed by a turning operation, but it is difficult to control the position of the groove within close tolerances. Furthermore, the tool used in the turning operation is necessarily small and is liable to break.

A further problem which arises in this known construction is that the most satisfactory position for the groove is not known exactly at the stage when the groove is formed in the yoke arm. It is desirable that no substantial clearance should exist between the components in the assembled joint. If such clearances exist, relative movement of the components can occur after the joint has been assembled and it will not be possible to ensure that the joint remains balanced about the rotary axes during use. Such imbalance as may occur gives rise to vibration of the joint in use which gives rise to undesirable noise and may lead to excessive wear of components of the joint or associated members. It is not possible to manufacture the components of the joint economically to within very close tolerances and therefore if the position of the groove is determined before the components of the joint are assembled, in at least some cases, there will be undesirable play between components of the joint.

A further form of retaining element which has been proposed has a plurality of arms which project radially from the centre of the retaining element. With this further form of retaining element, it is not necessary to preform a groove in the yoke arm. The retaining element is inserted into the opening of the yoke arm from the outer end thereof and is forced into engagement with an end wall of the bearing cup. The arms of the retaining element are so formed that they deflect as the retaining element is forced into the opening and tend to bite into the wall of the opening when the retaining element moves in a direction away from the rotary axis.

This further known construction has several disadvantages. If the joint is disassembled for servicing purposes, it is difficult or impossible to ensure that, upon reassembly of the joint, the retaining element is returned to its original position. If the retaining element is fitted in a new position, it is likely that the reassembled joint will be unbalanced. Although if the retaining element is urged outwardly of the opening in the yoke arm by the adjacent bearing cup, the arms of the retaining element will bite into the walls of the opening and thereby oppose such outward movement, movement of the retaining element in the outward direction is not completely prevented. The resistance to outward movement reaches a value sufficient to prevent further outward movement of the adjacent bearing cup and associated trunnion only when there has occurred sufficient outward movement to cause the arms to bite deeply into the walls of the opening. Accordingly, this form of retaining element cannot prevent play between components of the joint. Furthermore, the shape of the indentations made in the wall of the opening by the arms of the retaining element is such that the boundary of each indentation remote from the rotary axis is inclined at an obtuse angle to the adjacent surface of the wall of the opening. Abutment of the retaining element against this inclined surface does not provide secure retention of the retaining element within the opening and there is a risk that the retaining element will fail to remain in position throughout the service life of the joint.

It is an object of the present invention to provide a joint of the kind specified and a method of assembling such joint which reduces or overcomes one or more of the foregoing disadvantages.

SUMMARY OF THE INVENTION

According to a first aspect of the invention we provide a method of making a joint of the kind specified wherein a groove for receiving portions of a retaining element is formed in the wall of the opening of an associated yoke arm by inserting the retaining element into the opening and turning the retaining element relative to the yoke arm about the pivot axis to cut the groove.

Preferably a bearing cup is inserted before the retaining element into the opening, the bearing cup is displaced relative to the yoke arm to the position which the bearing cup is required to occupy during use of the joint, the retaining element is engaged with an end wall of the bearing cup and remains so engaged whilst being turned to cut the groove.

The retaining element may be contracted, during or prior to insertion into the opening, elastically from its unstressed size and, whilst being turned, be permitted to expand radially of the pivot axis towards its unstressed size.

According to a second aspect of the invention, we provide a joint of the kind specified wherein the wall of the opening in at least one of said yoke arms is formed with an annular groove and the retaining element associated with said yoke arm includes a plurality of fingers projecting radially of the pivot axis, a free end portion of each finger being seated in the groove.

The groove would normally have been cut by the retaining element engaged therein, but if the joint is diassembled, for example for maintenance purposes, a new retaining element may be fitted into the groove without any further cutting.

Preferably, the retaining element is formed at the free end of one or more of the fingers with a cutting edge which is parallel to the pivot axis. With this arrangement cutting of the groove by rotation of the retaining element about the pivot axis without movement therealong will result in the formation of a groove of rectangular shape in cross-section, the boundaries of the groove being parallel to and perpendicular to the pivot axis respectively.

According to a third aspect of the invention we provide a retaining element for a joint of the kind specified, the retaining element comprising a mid-portion which includes the centre of the retaining element and a plurality of fingers projecting from the mid-portion and extending radially with respect to the centre, the retaining element having a dished shape such that free end portions of the fingers are substantially co-planar and the mid-portion is off-set from the plane of the free end portions, a cutting edge being provided on each of said free end portions at the periphery of the retaining element and such cutting edge being perpendicular to the plane of the free end portions.

According to a fourth aspect of the invention we provide, for use in performance of the method of the invention, a tool comprising a hollow outer member and an inner member disposed therein, the outer member having abutments near to but spaced from one end of the outer member, these abutments facing towards said one end, and a plurality of legs projecting from positions between successive ones of said abutments to said one end of the outer member, and the inner member having abutments near to a corresponding end of the inner member and facing away from said corresponding end.

In use, the abutments of the outer member would be engaged with one face of an outer part of the retaining element, the abutments of the inner part would be engaged with the opposite face of an inner part of the retaining element and the inner member would be displaced relative to the outer member to dish the retaining element, or increase the extent to which the retaining element is dished, thereby contracting the retaining element radially for insertion into the opening of the yoke arm.

BRIEF DESCRIPTION OF THE DRAWINGS

The invention will now be described by way of example with reference to the accompanying drawings wherein:

FIG. 1 is a fragmentary view, partly in cross-section, of a joint of the kind specified, FIG. 1a is a perspective view of a retaining element of the joint of FIG. 1, FIG. 2 illustrates a method of assembly of the joint shown in FIG. 1 and shows, partly in cross-section, on the line A—A of FIG. 1, a portion of the joint and a tool used in assembly of the joint.

FIG. 3 is a perspective view of an inner part of the tool of FIG. 2, and

FIG. 4 is a fragmentary perspective view of an end portion of an outer part of the tool.

DETAILED DESCRIPTION

The joint illustrated in FIG. 1 comprises two yoke elements 10 and 11 respectively which in use rotate about respective rotary axes. In the straight position of the joint, which is illustrated in FIG. 1 these axes coincide and are indicated in FIG. 1 by reference numeral 12. Each yoke element includes a base portion 13 and a pair of arms 14 and 15 integral with the base portion and projecting therefrom in the axial direction.

A circular opening 16 is formed in each of the yoke arms adjacent to the free end thereof, the openings of the yoke element 10 being aligned with each other and the openings 16 of the yoke element 11 being aligned with each other. In each of the openings 16 there is received a bearing cup 17 which in turn receives a corresponding trunnion of a connecting member 18. The bearing cups contain needle bearings interposed between the trunnions and the peripheral walls of the cups, so that the connecting member is free to pivot relative to the yoke element 10 about a pivot axis 19 perpendicular to the rotary axis of the yoke element 10, and the yoke element 11 is free to pivot relative to the connecting member about a pivot axis 20 perpendicular to the pivot axis 19 and to the rotary axis of the yoke element 11.

The construction thus far described is conventional. It is also conventional to provide in the openings 16 of each yoke arm a retaining element for controlling movement of the associated bearing cup 17 and the trunnion contained therein in a direction along the pivot axis outwardly of the joint, the retaining elements collectively retaining the yoke elements, the bearing cups and the connecting member in assembled relation with one another.

In the particular example of joint shown in FIG. 1, identical retaining elements are provided in each of the four openings 16. Alternatively, it would be possible to provide a retaining element of the form illustrated in only one of the openings 16 of each of the yoke elements 10 and 11, and to provide a retaining element of conventional form, for example a circlip, in the other opening 16 of each of the yoke elements 10 and 11.

The retaining element 21 provided in the opening 16 of the yoke arm 14 of the yoke element 11 is formed from steel strip which can be hardened to a hardness considerably greater than that of the mild steel of which the yoke elements 10 and 11 are formed. The retaining element has a mid-portion 22 from which radiate four fingers 23 spaced apart by gaps 24. As shown in FIG. 1, the gaps 24 extend from the periphery of the retaining element rather more than half-way towards the centre.

The retaining element 21 is of dished shape, the mid-portion 22 and adjacent parts of the fingers 23 lying in a first plane and free end portions 25 of the fingers lying in a second plane off-set from the first plane. At the periphery of the retaining element, each of the free end portions 25 is formed with a pair of cutting edges 26 which are perpendicular to the plane of the mid-portion 22. The distance between diametrically opposite cutting edges 26 is a little greater than the diamter of the opening 16 in which the retaining element is to be received. After forming to this size and shape, the retaining element is hardened and tempered.

Prior to assembly of the components of the joint shown in FIG. 1, an annular groove 27 is formed in the opening 16 of the yoke arm 15 of each yoke element. The yoke elements 10 and 11, the intermediate member 18, the bearing cups 17 and the needle bearings are then assembled together. A retaining element 28, which may be identical with the retaining element 21, is then contracted radially, in the manner to be described hereinafter, is inserted into the opening 16 of the yoke arm 15 to a position in which the free end portions of the retaining element fingers are aligned with the groove 27. The retaining element is then permitted to expand so that the free end portions seat in the groove 27. It will be appreciated that contraction of the retaining element to a size such that it will pass into the opening 16 is within the elastic limit of the retaining element. Accordingly, the free end portions of the fingers will engage the groove 27 without application to the retaining element 28 of a force tending to expand same radially.

The intermediate member 18, the yoke element 10 and the bearing cups 17 associated therewith are then set to the required positions, such that there is no play between these components in a direction along the pivot axis 19. The retaining element 21, which has previously been contracted in the manner to be described to a size such that it can be inserted into the opening 16, is then inserted into the opening of the yoke arm 14 and is displaced into engagement with an end wall of the adjacent bearing cup 17. The retaining element is then permitted to expand radially and is turned about the axis 19 so that the cutting edges 26 cut an annular groove in the wall of the opening 16. It will be noted that although the free end portions 25 of the retaining element are engaged with the end wall of the bearing cup, the mid-portion 22 is spaced from this end wall. If required, pressure may be applied to the mid-portion 22 to urge the latter towards the adjacent bearing cup. Such pressure would tend to expand the retaining element and increase the pressure under which the cutting edges 26 engage with the yoke arm 14.

It will be noted that as the cutting edges 26 are parallel to the axis 19 and the retaining element 21 is turned about this axis without movment therealong, the groove cut in the wall of the opening 16 is of rectangular shape in cross-section, boundaries of the groove being parallel to and perpendicular to the pivot axis 19 respectively.

It will be noted that in the completed joint, the free end portions 25 of the retaining elements 21 and 22 engage with the outer surfaces of end walls of adjacent bearing cups 17 at positions immediately adjacent to the grooves formed in the walls of the openings 16. Furthermore, within these grooves, the free end portions engage shoulders which are perpendicular to the pivot axis 19 and face towards the rotary axis 12. Accordingly, the free end portions of the retaining element will not yield under pressure from the adjacent bearing cup to permit any displacement of such bearing cup in a direction along the pivot axis 19 away from the rotary axis 12. The retaining elements can be removed by applying to the mid-portion 22 a force in a direction away from the rotary axis 12. This will cause radial contraction of the retaining element and withdraw the free end portions from the grooves. However, as the mid-portion 22 is spaced from the end wall of the adjacent bearing cup, such force cannot be applied to the retaining element by the bearing cup itself.

The tool for contracting the retaining element 21 is illustrated in FIGS. 2, 3 and 4. The tool comprises an outer tubular member 29 and an inner tubular member 30 which is a sliding fit therein. At one end, the outer member 29 is formed with four short legs 31 which are spaced apart around the periphery of the outer member. Between the legs 31, the outer member presents towards the adjacent end abutment surfaces 31 which are spaced from the adjacent end of the outer member by a distance slightly less than the depth of the retaining element 21.

The inner member 30 of the tool is provided, at the end which corresponds to the end of the outer member 29 provided with the legs 31, with two diametrically opposed hook-like elements 33. These hook-like elements are integral with respective legs 34 of the inner member which are long, as compared with the legs 31 of the outer member. The free ends of the hooks 33 face each other across a longitudinal axis of the tool and the hook-like elements present respective abutment faces 35 which face in a direction along the longitudinal axis of the tool and away from the adjacent end of the inner member.

The tool further comprises screw means for acting between the inner and outer members to draw the inner member in a direction away from the legs 31 of the outer member. This screw means is in the form of a bolt, whereof the head 36 overlies an end face of the outer member 29 remote from the legs 31. A shank 37 of the bolt is in threaded engagement with the inner member 30 which is keyed against rotation relative to the outer member. The outer member is formed with flats which can be engaged by a spanner and accordingly the bolt 36 can be turned relative to the tubular members 29 and 30 to draw the inner tubular member towards the bolt head 36.

The tool is used by inserting the hook-like elements 33 through a pair of diametrically-opposite gaps 24 in the retaining element 21 and engaging the abutment faces 35 of the tool with that face of the mid-portion 22 of the retaining element which faces towards the rotary axis 12 in the assembled joint. The legs 31 of the outer member are received in the gaps 24 between the fingers of the retaining element, thereby keying the retaining element to the outer member for rotation therewith. The bolt head 36 is then turned to draw the inner member 30 in a direction away from the legs 31 and the retaining element is thereby drawn into engagement with the abutment faces 32 of the outer member. Continued rotation of the bolt head 36 dishes the retaining element more strongly, as shown in FIG. 2, thereby contracting it radially.

When the retaining element has been contracted to a size such that it can pass into the opening 16, the retaining element is so inserted and engaged with the adjacent bearing cup 17. The bolt head 36 is then rotated in the reverse direction to permit the retaining element to expand and the outer member 29 is subsequently turned about the pivot axis 19 to turn the retaining element relative to the yoke arm 14 and cut the groove therein.

I claim:

1. A method of making a Hooke's joint comprising two yoke elements which, in use, rotate about respective rotary axes and a connecting member connected to each of the yoke elements for pivotal movement about respective pivot axis which are mutually perpendicular wherein: each yoke element comprises a base portion and two arms projecting from the base portion in a direction longitudinally of the rotary axis, each yoke arm defines a respective opening, the connecting member comprises four trunnions which are received in respective ones of said openings, there is associated with each yoke arm a retaining element which controls movement of the associated trunnion relative to the yoke arm in a direction along the pivot axis outwardly of the joint, comprising inserting a retaining element into an opening of a yoke arm and is then turning the retainer element about the pivot axis to cut in the yoke arm a groove for receiving free end portions of the fingers of the retaining element.

2. A method according to claim 1 wherein a bearing cup is inserted into said opening before the retaining element is inserted therein, the bearing cup is displaced relative to the yoke arm to the position which the bearing cup is required to occupy during use of the joint, the retaining element is engaged with an end wall of the bearing cup and remains so engaged whilst being turned to cut the groove.

3. A method according to claim 1 wherein the retaining element is contracted, prior to insertion into said opening, elastically from its unstressed size and, whilst being turned, is permitted to expand radially of the pivot axis towards its unstressed size.

4. A method according to claim 3 wherein the retaining element is contracted by means of a tool and is held in the contracted condition by the tool until the retaining element has been inserted into the opening and moved to the required position relative to the yoke arm.

* * * * *